Patented June 5, 1934

1,961,691

UNITED STATES PATENT OFFICE 1,961,691

PROCESS FOR THE PRODUCTION OF PHOSPHATES AND HYDROGEN

Wladimir Nikolajewitch Ipatiew, Nikodem Caro, and Albert Rudolph Frank, Berlin, Germany, assignors to Bayerische Stickstoffwerke A. A., Berlin, Germany No Drawing. Application March 12, 1929, Serial No. 346,491. In Germany March 26, 1928

1 Claim. (Cl. 23—107)

The production of phosphates from elementary phosphorus has been carried out hitherto in oxidizing the phosphorus in one step or stage of the process to form phosphorus pentoxide or phosphoric acid and in converting in a second step or stage of the process the phosphoric acid by means of bases or salts.

A process has now been discovered according to which the phosphates can be obtained in one operation from the elementary phosphorus or phosphoretted hydrogen. With this object in view phosphorus or phosphoretted hydrogen is treated with at least that quantity of a metal, a base, a salt, a combination or mixtures of the same which is capable of reacting with phosphoric acid with the formation of phosphate, and with water, under a high pressure and at high temperatures up to 600° C. The height of the pressures and temperatures applied depends on the desired reaction speed. As pressure and temperature influence the speed of the reaction in the same sense it is possible to obtain approximately similar results at lower temperatures and high pressures or at higher temperatures and lower pressures. The phosphorus or phosphoretted hydrogen is in this process quantitatively converted to phosphate and at the same time pure hydrogen under pressure which especially when maintaining this pressure may be subsequently used for pressure syntheses, as for instance for the production of methanol or ammonia. If it is desired to work at high pressures and lower temperatures it may be necessary to carry out the reaction under pressure. In this case the pressure is preferably produced by such gases which subsequently can be worked up with the hydrogen produced as for example nitrogen when the gas is to be used in the synthesis of ammonia; it is however also possible to use hydrogen as even at high pressures no unfavourable influence on the oxidation reaction by this hydrogen could be ascertained.

Examples (1) A little more than 2 molecular proportions of ammonia in the form of concentrated aqueous ammonia and 1 atomic proportion of phosphorus are heated in a silver lined autoclave provided with a stirrer until the pressure in the autoclave increases no longer whereupon the liquid reaction product is withdrawn from the autoclave and cooled slowly. The reaction proceeds in accordance with the equation

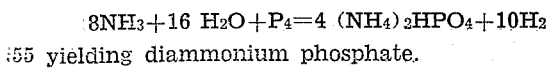

yielding diammonium phosphate.

According to the concentration of the solution from 60 to 90 per cent of the salt are directly obtained in the crystallized state without concentrating the solution. The hydrogen obtained must be freed of excess ammonia; its content in phosphoretted hydrogen is practically nil. The introduction of the phosphorus into the reaction vessel is preferably effected by pressing it in by portions in the liquid state whereby the rate of conversion per unit of time is substantially increased.

When using from 1 to 1½ molecular proportions of ammonia in the manner indicated above, monoammonium phosphate is produced under otherwise similar conditions but at a lower pressure.

As is known, the crystallization of almost all substances is furthered if the conversion by which the said substances are produced takes place under pressure, so that in this way even substances which do not crystallize readily, can be obtained in the crystalline state. This rule applies also to the phosphates and especially to diammonium phosphate which crystallizes only with difficulty, but much better under increased pressure than at atmospheric pressure.

A further effect of the pressure is its influence on the composition or rate of formation of the solid phase depending on the partial pressure or pressures of the volatile component or components present in the gaseous state. Thus, for example in the present case ammonia with phosphoric acid supplies, according to the ammonia pressure applied, mono-, di-, or tri-ammonium phosphate.

By suitably varying the rate at which the pressure is released and the rate of cooling of the reaction products, the desired solid phase can consequently be produced by utilizing the influence of the pressure on the course of the crystallization. The best conditions for each individual case are directly readable from phase diagrams which are known or can readily be determined by known methods.

By varying the quantity of water added before or in the course of the reaction or afterwards, the physical form of the reaction products obtained can be influenced. In the presence of a large quantity of water a diluted solution, and with a small quantity of water, a highly concentrated solution is of course obtained; such concentrated solutions may be treated to form a pulverulent product by spray-drying or the greater part of the reaction product may be caused to crystallize in the desired kind and size of the grains by cooling under appropriate conditions of temperature and, if desired, while stirring. This crystallization proceeds particularly well if it is carried out while utilizing completely or partly the pressure produced by the reaction.

(2) One molecular proportion of tri-calcium phosphate, slightly more than 1 atomic proportion of phosphorus and from 4 to 7 molecular proportions of water are heated while stirring in an autoclave lined for example with copper phosphide (originally a copper lining) until the pressure in the autoclave remains constant. A calcium phosphate which is practically completely soluble in the usual citrate solution is produced and in addition thereto 5 molecular proportions of hydrogen are obtained for each two atomic proportions of phosphorus used. The hydrogen must be freed from the small amounts of phosphoretted hydrogen present therein in case it is to be used for catalytic purposes. If the pressure is released from the pasty reaction product while the latter is still hot, the disintegrated phosphate is obtained in a dry state. When employing for the reaction phosphorite, more phosphorus and water must be used in view of the greater amount of calcium present therein.

We claim:—

The process of producing a phosphate and hydrogen which comprises causing water to act upon elementary phosphorus under a high pressure and at high temperatures up to 600° C. in the presence of ammonia.

WLADIMIR NIKOLAJEWITCH IPATIEW.
NIKODEM CARO.
ALBERT RUDOLPH FRANK.